US008689323B2

(12) United States Patent
Gut et al.

(10) Patent No.: US 8,689,323 B2
(45) Date of Patent: Apr. 1, 2014

(54) METHOD FOR ACTIVATING FUNCTIONS OF A TACHOGRAPH

(75) Inventors: Michael Gut, Braeunlingen (DE); Edmund Mattes, Spaichingen (DE)

(73) Assignee: Continental Automotive GmbH, Hannover (DE)

( * ) Notice: Subject to any disclaimer, the term of this patent is extended or adjusted under 35 U.S.C. 154(b) by 245 days.

(21) Appl. No.: 13/119,087

(22) PCT Filed: Sep. 8, 2009

(86) PCT No.: PCT/EP2009/061646
§ 371 (c)(1),
(2), (4) Date: Mar. 15, 2011

(87) PCT Pub. No.: WO2010/029084
PCT Pub. Date: Mar. 18, 2010

(65) Prior Publication Data
US 2011/0173694 A1    Jul. 14, 2011

(30) Foreign Application Priority Data
Sep. 15, 2008   (DE) .......................... 10 2008 047 433

(51) Int. Cl.
*H04L 29/06*   (2006.01)

(52) U.S. Cl.
USPC ................... 726/20; 726/3; 726/21; 455/411; 455/426.1; 710/301; 713/189; 713/193; 715/771; 701/115

(58) Field of Classification Search
USPC ........ 726/20, 21, 3; 713/193, 189; 455/426.1, 455/411; 710/301; 715/771; 701/33, 35, 701/115
See application file for complete search history.

(56) References Cited

U.S. PATENT DOCUMENTS

| 5,581,464 A | 12/1996 | Woll et al. |
| 6,819,986 B2 | 11/2004 | Hong et al. |
| 7,502,353 B2 | 3/2009 | Bolz |
| 2003/0069673 A1 | 4/2003 | Hong et al. |
| 2009/0019387 A1* | 1/2009 | Lindinger et al. ............ 715/771 |
| 2009/0234535 A1* | 9/2009 | Lange et al. .................... 701/35 |
| 2009/0327760 A1* | 12/2009 | Lindinger et al. ............ 713/193 |
| 2010/0075633 A1* | 3/2010 | Lydike et al. ................. 455/411 |
| 2010/0250053 A1* | 9/2010 | Grill et al. ........................ 701/33 |
| 2011/0099314 A1* | 4/2011 | Hoffmann et al. ............ 710/301 |

FOREIGN PATENT DOCUMENTS

| DE | 10237715 | 2/2004 |
| DE | 10 2006 044 737 A1 | 3/2008 |

(Continued)

*Primary Examiner* — Brandon Hoffman
*Assistant Examiner* — Hee Song
(74) *Attorney, Agent, or Firm* — Cozen O'Connor

(57) ABSTRACT

A method for activating functions of at least one tachograph having a control unit and an interface. The control unit is activated by a program to perform a first group of functions. First, a connection of an external storage medium to the interface of the at least one tachograph is established. The storage medium has at least one instruction for activating a function, which can be read out by the control unit. An authentication between the external storage medium and the control unit also takes place. The function associated with the at least one instruction is activated in such a way that the function is associated with the first group of the control unit. Next, the connection between the external storage medium and the interface of the at least one tachograph is released.

8 Claims, 3 Drawing Sheets

(56) References Cited

FOREIGN PATENT DOCUMENTS

| | | |
|---|---|---|
| DE | 10 2007 004645 | 7/2008 |
| EP | 1 283 501 | 2/2003 |
| EP | 1 587 036 | 10/2005 |
| WO | WO 94/04975 | 3/1994 |
| WO | WO 2008/090057 * | 7/2008 ............... G07C 5/08 |

* cited by examiner

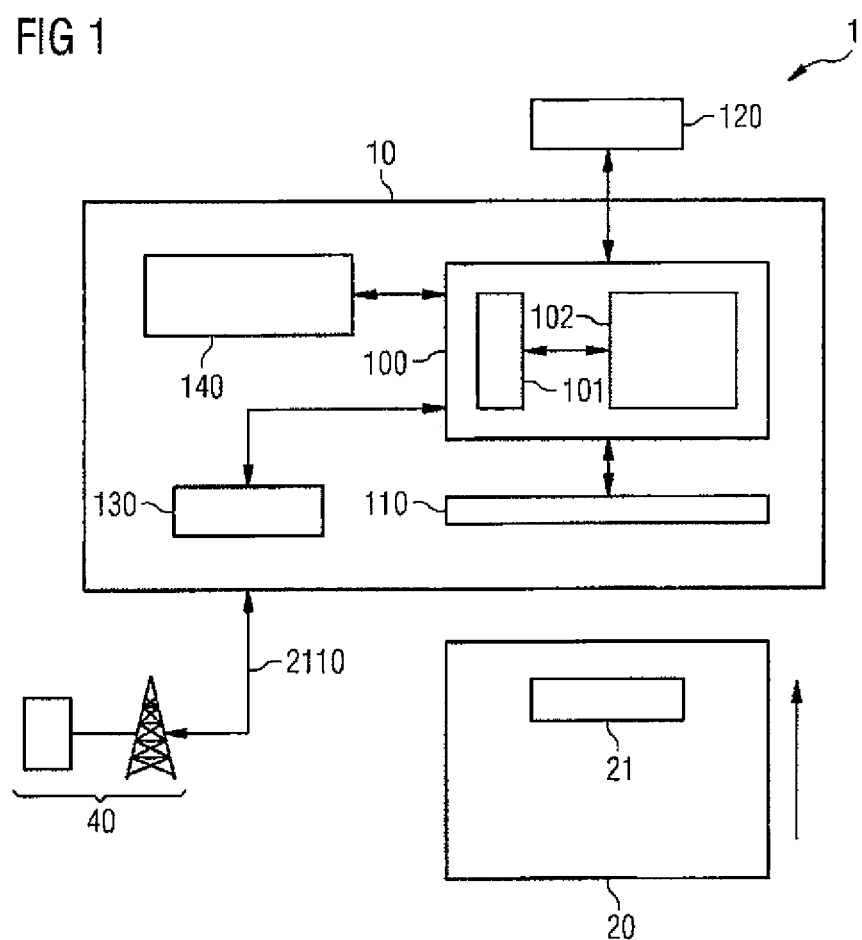

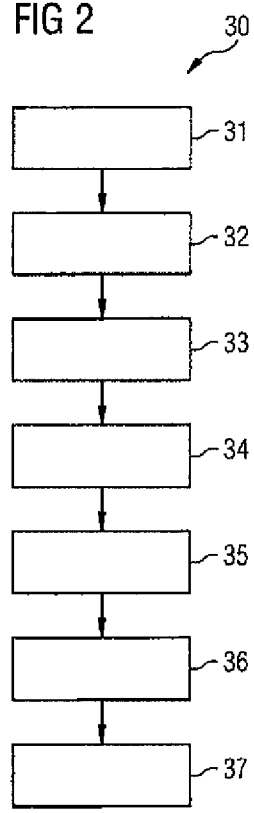

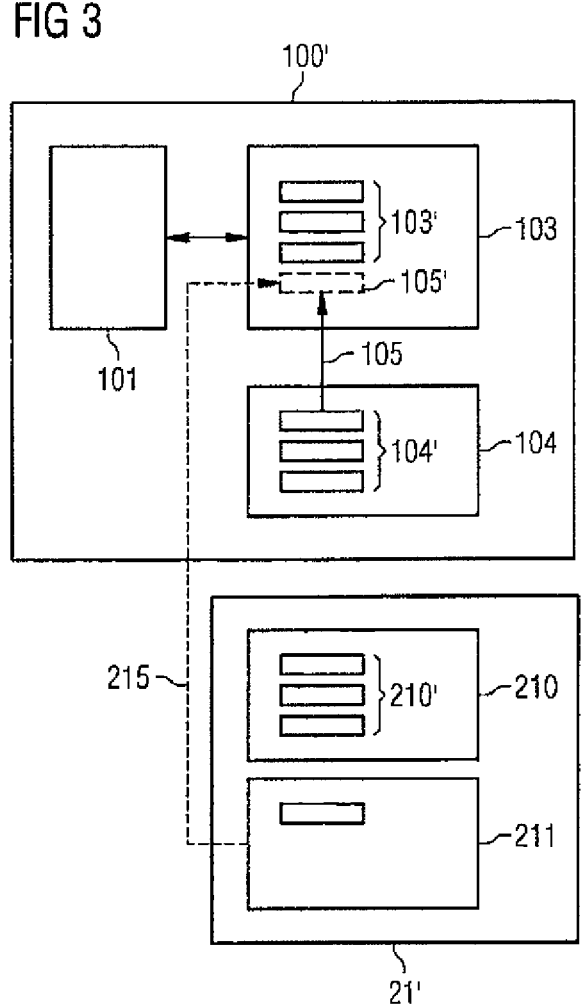

US 8,689,323 B2

METHOD FOR ACTIVATING FUNCTIONS OF A TACHOGRAPH

PRIORITY CLAIM

This is a U.S. national stage of Application No. PCT/EP2009/061646, filed on Sep. 8, 2009, which claims priority to German Application No: 10 2008 047 433.9, filed: Sep. 15, 2008, the contents of which are incorporated herein by reference.

BACKGROUND OF THE INVENTION

1. Field of the Invention

The invention relates to a method for enabling functions of at least one tachograph that comprises a control unit and an interface connected thereto in which the control unit is enabled by programming to perform a first group of functions.

2. Related Art

The prior art discloses tachographs, particularly digital tachographs. A tachograph has a control unit and also a multiplicity of different interfaces. A display that can be read by a user of the tachograph is also built into the tachograph.

The control unit of the tachograph is designed such that a multiplicity of functions can be performed by the control unit. This relates particularly to functions such as the recording of the distance covered, the travelling time, the average, maximum or similar speed of travel during a route section and also the distance covered on a highway or a rural road. The aforementioned exemplary functions are performed by a microprocessor in the control unit, the data associated with the functions often being received from an onboard computer or an engine controller via a CAN interface.

The tachograph is often built in by the manufacturer of the vehicle and delivered to a customer. The tachograph itself is in turn produced by another manufacturer. The manufacturer of the vehicle often adapts the tachograph for the specifications of the vehicle type used. This means that not all the functions that can be performed by the control unit need to be enabled. Although the microprocessor in the control unit is designed by programming such that it can perform all functions that are stored in a memory element in the control unit, it cannot access all the aforementioned functions. The total number of the performable functions is broken down into a first group of already enabled and performable functions and a second group of the functions which are not enabled but which are present.

For an operator of the vehicle, this results in the problem that the tachograph has been configured by the manufacturer of the vehicle and is not attuned to the individual requirements of the customer. If the customer now wishes to adapt the tachographs to suit his own requirements, he is forced to take the vehicle to an authorized garage in which the additionally required functions are enabled by specialist personnel.

SUMMARY OF THE INVENTION

It is an object of one embodiment of the present invention to specify a method for enabling functions which no longer requires the vehicle to be taken to a garage, and therefore allows the vehicle's idle periods to be reduced to a minimum.

The method according to one embodiment of the invention involves an external storage medium being connected to an interface of the at least one tachograph, wherein the storage medium has at least one instruction that can be read by the control unit for the purpose of enabling a function. This instruction may be implemented in the form of an executable program code or may be implemented by circuitry on the external storage medium and may optionally contain the function that is to be enabled. The instruction that can be read by the control unit for the purpose of enabling a function can firstly result in a function that is already stored in the control unit of the at least one tachograph becoming executable by the control unit, i.e. being enabled, or may secondly result in a function already present being replaced by an updated version of the function. In addition, this can also be understood to mean that a function that is not being stored in the control unit to date is transferred from the external storage medium to the control unit.

In order to prevent misuse of the external storage medium, authentication is additionally performed between the external storage medium and the control unit. This ensures that the instruction present on the external storage medium for the purpose of enabling a function can be performed on the tachograph. By way of example, such authentication can be implemented by virtue of the connection of the external storage medium to the interface of the at least one tachograph needing to be preceded by the insertion of what is known as a company card into the tachograph, and the interval time between the connection to the company card and the external storage medium not being permitted to exceed a stipulated interval. The information associated with the company card is used to ensure that the connection between the external storage medium and the interface of the at least one tachograph is authorized.

In the event of positive authentication between the external storage medium and the control unit, the instruction that can be read by the control unit is taken as a basis for enabling the function associated with the at least one instruction such that the function from the first group is associated with the control unit.

In addition, the connection between the external storage medium and the interface of the at least one tachograph is broken, so that the external storage medium can be used for further purposes. The interface that was originally in use by the external storage medium is also enabled for further storage media, such as a driver card.

Since the information for enabling functions is stored on the external storage medium and said storage medium can be inserted into the tachograph by the customer himself, there is no need to visit a garage, when the functions need to be enabled by a specialist. As a result, the step of adapting the functionality of the tachograph to suit the individual needs of the customer is firstly simplified and is secondly performed without the vehicle being forced into an idle phase on account of the visit to garage.

In one embodiment, the function is enabled on a number of tachographs stipulated by the external storage medium. This allows an external storage medium to be used to enable a multiplicity of tachographs in terms of the function linked to the at least one instruction. When the external storage medium is purchased, it can be indicated how many tachographs need to be enabled, and payment of a fee that corresponds to the number allows a memory card to be used to enable the function on a multiplicity of tachographs in the vehicle fleet that corresponds to the number. By way of example, this involves an electronic meter or counter being arranged on the external storage medium, said external storage medium storing the stipulated number and/or the number of enabling operations already performed using the external storage medium and/or the sum of the difference between these two variables. It goes without saying that the external storage medium can also be used to enable a multiplicity of functions. In this case too, the electronic meter can establish how many enabling operations have already been performed for functions, and can store how many further enabling operations are possible.

In a further embodiment, the external storage medium is designed in the form of a memory card. In this case, the interface of the at least one tachograph is a memory card reader, as is already used in digital tachographs. This means that no design changes are required on the tachograph.

In a further embodiment, the control unit is designed by programming to perform a second group of functions, the functions from the second group preferably already being present in the control unit, but not being able to be performed by the control unit. As a result, the tachograph may already contain all functions, which means that the enabling of the functions by the external storage medium does not use any further additional memory space.

In this context, the at least one instruction can associate a function from the second group with the first group. In this case, the function is merely readdressed in a storage medium in the control unit, for example, so that said function can be performed by the control unit.

In a further embodiment, the at least one instruction comprises a function that actuates an available further interface of the tachograph, preferably an interface accessible from a side of the tachograph that faces the vehicle interior, by programming such that said interface is designed for wireless data interchange between the tachograph and an external data processing installation.

The enabling of such a function subsequently allows data captured by the tachograph for the purpose of vehicle operation to be downloaded by an external data processing installation without prior insertion of the company card into the tachograph, i.e. the authentication is no longer performed using a company card connected directly to the tachograph, but rather is performed using a remote upload/download method. The function thus first of all enables the further interface and allows the connection of a further module responsible for the actual wireless or radio-based communication between the tachograph and the external data processing installation. At the same time, it is stipulated that the communication between the tachograph and the external data processing installation is performed merely by those external data processing installations identified by the specific company card. This prevents the data from being able to be downloaded or stolen by alien users. It is therefore preferably necessary to apply not only authentication but also encryption of the wireless connection between the tachograph and the external data processing installation.

A system according to the invention for performing the various embodiments of the method contains at least one digital tachograph and an external storage medium, which are each designed by programming in the form of software or hardware to perform the method.

BRIEF DESCRIPTION OF DRAWINGS

The invention is intended to be explained in more detail below using an exemplary embodiment. In the drawings:

FIG. 1 is a schematic illustration of a system for performing the method;

FIG. 2 is a flowchart of the method; and

FIG. 3 is a schematic illustration of the association of functions and the enabling of the functions.

DETAILED DESCRIPTION OF DRAWINGS

FIG. 1 is an exemplary system 1 comprising a digital tachograph 10 and an external storage medium 20 in the form of a memory card.

The digital tachograph 10 has a control unit 100 comprising a microprocessor 101 and a memory 102. The control unit 100 is connected to an interface 110 in the form of a card reader and can receive the memory card 20. The control unit 100 is also connected to a CAN interface 120, the CAN interface 120 being connected to the onboard controller and/or the engine controller of the motor vehicle, in which the digital tachograph 10 is installed. In addition, the digital tachograph 10 has a further interface 130 accessible via the front side of the digital tachograph and to which additional device modules or diagnostic tools can be connected. An additional device module could be, for example, a GSM or UMTS module for wirelessly transmitting data with an external data processing installation 40. The digital tachograph 10 also has an LC display 140 on which control commands can be output in a manner visible to the user of the digital tachograph 10.

In the control unit 100, the microprocessor 101 and the memory 102, which may be in the form of a flash memory or EEPROM for example, are connected. A multiplicity of commands or functions that can be performed by the microprocessor 101 are stored in the memory 102. In this case, a distinction should be made between a first group of functions, which can be accessed by the microprocessor 101, and a second group of functions which, although present, cannot be accessed by the microprocessor 101.

The interface 110 in the form of a card reader can receive the external storage medium 20. In this case, a memory chip 21 arranged on the external storage medium 20 is read. In this case, the memory chip 21 is designed by programming in such a manner that at least one instruction for enabling a function is stored on the memory chip 21. In this case, the instruction for enabling a function can result in a function in the memory 102 being enabled in the control unit 100, which function makes it possible to wirelessly interchange data 2110 via a card module that can be connected to the further interface 130 and the external data processing installation 40.

One embodiment of the method according to the invention is intended to be explained in more detail below using the flowchart of FIG. 2. Within the scope of the method 30, a connection 31 is first of all established between the external storage medium 20 and the interface 110 of the at least one tachograph 10. Based on the system 1 in FIG. 1, this may be, for example, the insertion of the memory card 20 into the card reader 110. After the connection 31 has been established, the external storage medium 20 is read by the control unit 100. In this case, a check 32 is carried out and is used to determine whether or not the function included in the at least one instruction for enabling a function is already installed on the tachograph 10. If the function is already installed, the external storage medium 20 can be automatically ejected from the digital tachograph 10. If the function included in the instruction has not yet been enabled on the digital tachograph, authentication 33 is performed between the external storage medium 20 and the control unit 100 of the tachograph 10. This may be performed, for example, by virtue of the external storage medium 20 being authenticated in an external data processing installation, for example the data processing installation 40, of the company by the company card present in the company that contains the information associated with the company card.

During authentication 33, the control unit 100 first of all reads the data from the external storage medium 20 and identifies whether said data can be associated with the same company card needed to read information from the tachograph 10. Conversely, the external storage medium 20 reads whether the control unit 100 can likewise be associated with this company card. For additional protection, data can be interchanged between the external storage medium 20 and the control unit 100 in encrypted form in order to prevent data stored on the tachograph 10 being improperly read using manipulated external storage media.

Following positive authentication, a check 34 is carried out in order to determine whether the number of operations for enabling the functions, as defined on the external storage medium, has already been reached or whether further operations for enabling the function are possible. If a further enabling operation is possible, the function is enabled 35 on the basis of the at least one instruction stored on the external storage medium. The instruction may be executed, for example, by command sequences or the transfer of parameters. In this case, the command sequences may essentially comprise new functions and/or updated functions or may instruct the control unit to associate a function which has hitherto been associated with the second group of functions, for example, with the first group.

After the enabling operation 35 has been carried out, a further check 36 is carried out, during which the ability to perform the enabled function properly is checked. During the check 36, the electronic meter of the external storage medium may likewise be activated and the number of enabling operations which are still possible can be reduced by one or by the number of enabled functions.

The values stored in the electronic meter are preferably changed only when the functionality has been successfully checked.

The external storage medium 20 is finally ejected from the tachograph 10, with the result that the connection between the external storage medium and the interface of the at least one tachograph is broken 37.

Accompanying the different method steps 31 to 37, notifications can be output on a display 140 of the digital tachograph 10. This makes it possible for the user monitoring the method to track whether the different method steps have been successfully concluded. In order to also subsequently enable this monitoring, what is known as a log file may additionally be stored on the external storage medium 20 before the external storage medium 20 is ejected. This log file may be read and checked by the external data processing installation 40, for example.

FIG. 3 is intended to be used to illustrate how a function can be enabled using an instruction stored on the external storage medium. FIG. 3 shows a control unit 100' having a microprocessor 101 and a memory 102'. The memory 102' comprises, inter alia, a first group 103 of functions and a second group 104 of functions. The first group 103 comprises functions 103' that can be performed by the microprocessor 101. This is indicated by the connection between the first group 103 and the microprocessor 101.

The second group 104 comprises a multiplicity of functions 104' that cannot be accessed by the microprocessor 101.

The memory chip 21' comprises an instruction 210, the instruction 210 comprising a multiplicity of control commands 210'. A further instruction 211 is also present.

After a connection has been established between the memory chip 21' stored on an external storage medium and the control unit 100', the instruction 210 is read by the microprocessor 101 in a first operating mode. In this case, the functions 210' are functions which update a subset of the functions 103', that is to say the subset of the functions 103' are replaced by the functions 210'. This makes it possible to continuously operate the control unit 100' of the digital tachograph in an updated version.

In a second operating mode, the instruction 210 may comprise functions 210' THAT instruct the microprocessor 101 to now associate a function that has hitherto been associated with the second group 104 with the first group 103. This function 105' which is newly associated with the first group 103 is defined as now belonging to the first group 103 by an address change 105.

In a third operating mode, it is possible to use the further instruction 211 to associate a function which has hitherto not been present in the first group or second group with the first group 103. In this case, an address change 215 or an operation for copying the function 211' included in the instruction 211 to the function 105' is carried out.

The instruction 211 may thus comprise, for example, the enabling of the function for wireless data interchange 2110, as shown in FIG. 1. However, the same functionality can also be enabled by an instruction 210.

Apart from the function which has been mentioned hitherto and is intended to design the further interface by programming for the purpose of wirelessly interchanging data with an external data processing installation, the functions to be enabled may comprise, for example, the enabling of a rotational speed profile, the enabling of a velocity profile or the recording of further data provided by the onboard controller or engine controller.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for enabling at least one function of at least one tachograph that comprises a control unit and an interface connected to the control unit, wherein the control unit is enabled by programming to perform a first group of functions, the method comprising:
   connecting an external storage medium to the interface of the at least one tachograph, wherein the external storage medium includes at least one instruction that can be read by the control unit to enable a function;
   performing authentication between the external storage medium and the control unit;
   enabling the function associated with the at least one instruction;
   associating the function with the first group; and
   breaking the connection between the external storage medium and the interface of the at least one tachograph, wherein the at least one instruction comprises another function, wherein the another function enables an available further interface of the tachograph, wherein the function can be enabled on a number of tachographs, the number of tachographs determined by a magnitude of a difference between a number stipulated by the external storage medium stored on the external storage medium and a number of enabling operations already performed by the external storage medium.

2. The method as claimed in claim 1, further comprising displaying on a display of the at least one tachograph one of a successful enabling of the function and a failed enabling of the function.

3. The method as claimed in claim 1, wherein the external storage medium is arranged on a memory card, and the interface of the at least one tachograph is a memory card reader.

4. The method as claimed in claim 1, wherein the at least one instruction comprises a function that one of replaces and updates a function associated with the first group.

5. The method as claimed in claim 1, wherein the control unit is configured by programming to perform a second group of functions.

6. The method as claimed in claim 5, wherein the at least one instruction associates a function from the second group with the first group.

7. The method as claimed in claim 1, further comprises displaying on a display of the at least one tachograph one of a successful enabling of the function and a failed enabling of the function.

8. The method as claimed in claim 1, wherein the further interface is accessible from a side of the tachograph that faces the vehicle interior and configured to interchange data wirelessly.

* * * * *